Figure 1:
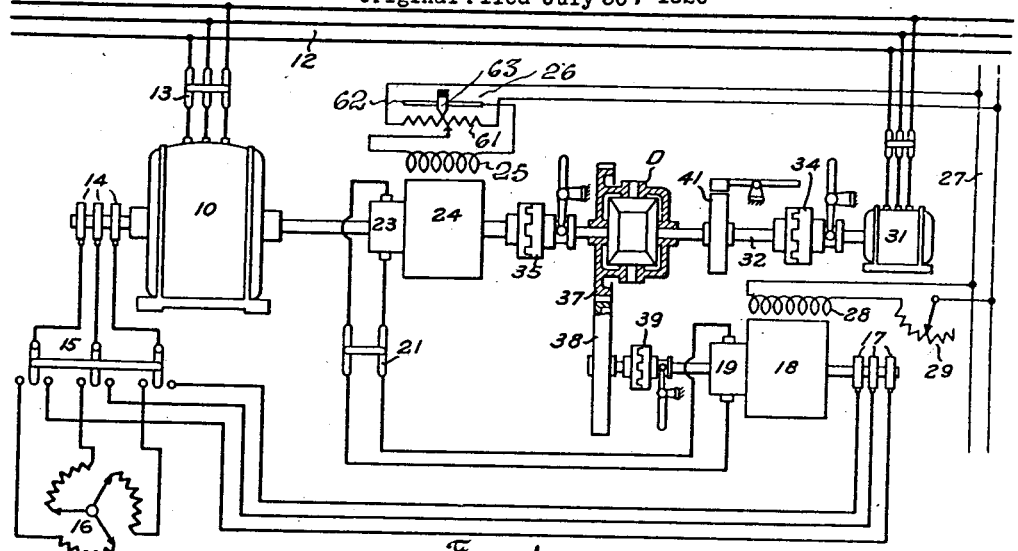

Nov. 27, 1928.

H. V. NYE 1,693,587

INDUCTION MOTOR CONTROL SYSTEM

Original Filed July 30, 1920

Inventor
H. V. Nye
by
Attorney

Patented Nov. 27, 1928.

1,693,587

UNITED STATES PATENT OFFICE.

HENRY V. NYE, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

INDUCTION-MOTOR-CONTROL SYSTEM.

Application filed July 30, 1920, Serial No. 400,199. Renewed September 19, 1925.

This invention relates in general to the speed control of alternating current motors, especially such as may have operating characteristics of induction motors, and has particular relation to the speed control of induction motors where such control is exercised through a rotary converter and a direct current machine interconnected with the induction motor.

One system of control for induction motors, known commercially as the Kraemer system, involves the use of a rotary converter having its alternating current side connected to the secondary of the induction motor and its direct current side connected to the armature of a direct current machine. Such a system of control is readily capable of producing satisfactorily stable operation of the motor at different speeds below synchronism, and this without the heavy losses present where the lower speeds are secured by inserting resistance in the secondary circuit of the motor.

With this Kraemer system of control, the speed is varied by varying the excitation of the field of the direct current machine. In theory, a set of this character is just as readily operable at any speed above synchronism as below synchronism, the variation in speed from the minimum sub-synchronous speed being effected by reducing the field of the direct current machine to zero, at which time, according to theory, the speed of the set should be the synchronous speed of the induction motor, and to bring the speed above synchronism should be merely a matter of reversing and increasing the field on the direct current machine. However, due to the inherent slip in an induction motor, which causes it to operate at a speed below synchronism, even with no load; and also due to the fact that the rotary converter will fall out of step with the low frequency current supplied to its alternating current side when the speed of the induction motor is near synchronism, it is extremely difficult and impracticable to bring the set through actual synchronism and to a stable operating speed above synchronism. This is the case to a greater extent when there is a load upon the induction motor.

With the ordinary system of this character, when the voltage of the direct current machine is reduced to zero, the rotary converter tends to come to a stop, since the speed of the induction motor is very near synchronism and the voltage and frequency of the secondary current is of very small value.

If the field of the direct current machine is reversed and increased in strength, with the rotary converter stationary, a direct current of increasing voltage is supplied, through the armature of the rotary converter, to the secondary winding of the induction motor. This direct current tends to excite the induction motor as a synchronous motor and causes it to pull into synchronism. Increasing the field of the direct current machine, while the rotary is at a standstill, merely strengthens the field of the induction motor now acting as a synchronous motor. It is only when the voltage of the direct current is increased to a quite considerable value that the rotary converter is able to exert sufficient motor action to start in the proper direction.

This instability of the speed of an induction set of this general character has been recognized in the prior art to the extent of supplementing the normal driving power of the converter, that is, slip energy of the main induction motor, by an auxiliary induction motor mounted on the converter shaft and having its primary element supplied with energy of line frequency and its secondary element supplied from a synchronous generator mounted on the shaft of the main induction motor and capable of furnishing energy of line frequency when operating at the synchronous speed of the main induction motor. With the same number of poles on the auxiliary and main motors, when the latter is operating at synchronous speed, the current in the primary and secondary elements of the auxiliary induction motor is of the same frequency, and hence the speed is zero and no torque is exerted on the converter shaft. While this modification of the original Kraemer system, during operation at a speed appreciably above or below synchronous speed, includes the effect of adding torque to the converter shaft, to assist in maintaining the latter in step with the main induction motor, nevertheless, there is no positive insurance of the required torque to maintain the converter in step with the main induction motor as the speed of the latter closely approaches synchronism. This deficiency of the modified system is due to the fact that the torque exerted by the auxiliary motor actually decreases to zero as the speed of the main motor reaches synchronism, just as does the torque exerted by the converter itself.

A feature of the present invention is the provision of a system of control of the general character described and including means for applying to the shaft of the rotary converter a mechanical torque of sufficient strength to cause the armature thereof to revolve at the required speed and in the proper direction to thereby cause the motor speed to increase from a synchronous to a super-synchronous speed. With the induction motor brought up to synchronous speed, when the converter is once started through the effect of the mechanical torque and also the motor torque due to the direct current impressed upon the armature of the converter, it ceases to supply direct current to the main motor, but, instead, supplies low frequency alternating current of an increasing frequency, which causes the speed of the induction motor to increase to a super-synchronous speed determined by the voltage on the direct current machine.

It is an object of this invention to provide an improved method and means for controlling an alternating current motor, in accordance with which the speed is controlled through a rotary converter and a direct current machine, and the set is operable at any desired speed below or above synchronous speed of the motor.

It is a further object of this invention to provide an improved method of controlling induction motors, and an improved system of control therefor in accordance with which the speed is controlled through a rotary converter and a direct current machine, and means are provided for applying a mechanical torque to the shaft of the rotary converter to cause the latter to operate in the proper direction and thus enable the speed of the motor to pass through synchronism.

These and other objects and advantages are attained by this invention, various novel features of which will appear from the description and drawing, forming part of this application and disclosing embodiments of the invention, and will be more particularly pointed out in the claims.

In the drawings: Fig. 1 is a diagrammatic showing of a system of induction motor control embodying features of this invention.

Figure 2:
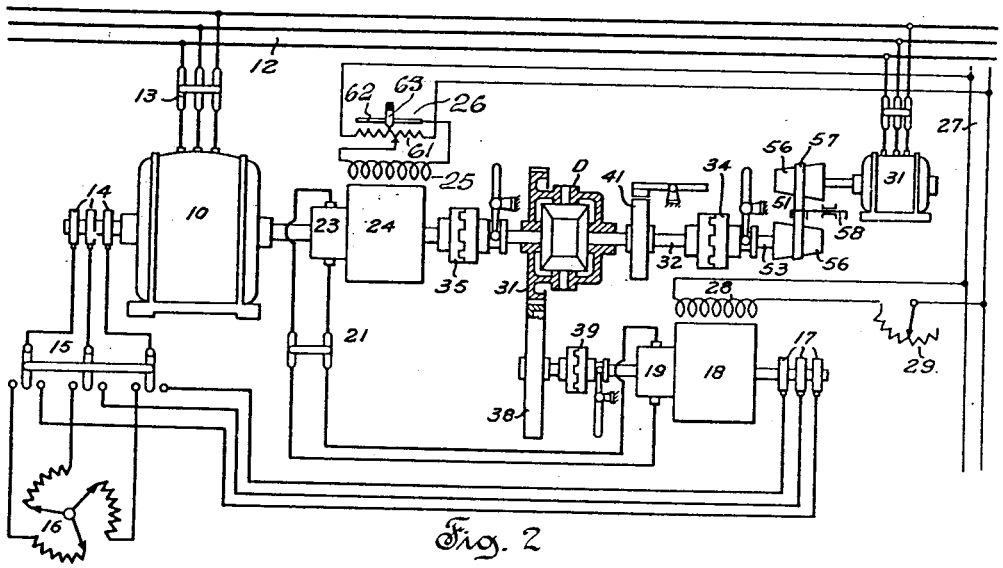

Fig. 2 is a view similar to Fig. 1 showing a modification of the embodiment of the invention shown in Fig. 1.

In accordance with the disclosure of Fig. 1, an induction motor 10 has its primary circuit supplied from an alternating current supply line 12 preferably through a switch 13, the secondary circuit of the motor being of the phase-wound type and connected through slip rings 14 and a switch 15 to a variable resistance 16. The switch 15 has a second operative position in which it connects the secondary of the motor 10 to the alternating current slip rings 17 of a rotary converter 18. The direct current side 19 of the rotary converter is connected through a switch 21 to the armature or its commutator 23, of a direct current machine 24, here shown as being mounted upon the shaft of the induction motor 10. The field 25 of the direct current machine is connected through a variable and reversible rheostat 26 to a direct current supply line 27. The field 28 of the rotary converter 18 is connected through a variable resistance 29 to the direct current supply line 27.

The reversible rheostat 26, shown in conventional form, comprises a resistance element 61, to a middle point of which one terminal of the field winding 25 is permanently connected, and a fixed contact plate 62 adjacent the resistance element, the other terminal of the winding 25 being permanently connected to this contact plate 62. A movable bridging contact 63 is always in contact with the contact plate 62 and contact points on the resistance element 61. When the contact 63 is in mid position, the terminals of the winding 25 are at the same potential and no current flows in the winding. By shifting the contact 63 to a suitable point on one or the other side of mid position, current of the desired intensity and direction may be caused to pass through the field winding 25.

With the system described above, it will be apparent that the speed of the induction motor may be caused to vary, by variation of the resistance of the field circuit of the direct current machine 24, from a value slightly below synchronous speed of the motor to a minimum value determined by the size of the direct current machine and the rotary converter relative to the induction motor. Likewise, it will be apparent that when once the induction motor is brought to a stable operating speed appreciably above synchronous speed, the speed may be caused to vary, by variation of the resistance of the field circuit of the direct current machine with the direction of current flow therethrough reversed, between a value slightly above synchronism and a maximum speed likewise determined by the size of the direct current machine and the rotary converter relative to induction motor.

The induction motor 10, may be started in the usual manner by connecting the secondary circuit thereof to the variable resistance 16 with the primary circuit closed through the switch 13. By decreasing the resistance in the secondary circuit, the speed of the motor may readily be brought up to a value slightly below synchronous speed, at which time the secondary circuit may be disconnected from the variable resistance 16 and connected to the alternating current side of the rotary converter 18. With the circuit between the direct current side of the rotary converter and the direct current machine 24 closed through the switch 21, it will be apparent that any stable operating speed of the induction motor 10 below synchronous speed thereof may be attained.

With the apparatus described above, the maximum sub-synchronous speed of the motor 10 is attained when the field excitation of the direct current machine 24 is reduced to zero, the actual speed at this time probably being from 1% to 3% below synchronous speed depending upon the design of the apparatus. Under these conditions of maximum sub-synchronous speed, the frequency and voltage of the current in the secondary circuit of the induction motor and the armature of the converter are a minimum, and, with an ordinary amount of friction in the rotary converter, the latter is liable to come to a dead stop since the alternating current supplied to the converter is incapable of exerting the torque required to maintain it in operation.

If the field of the direct current machine be reversed and increased in the opposite direction with the rotary converter at a standstill, a direct current from the machine 24 is passed through the armature of the rotary converter and the secondary of the induction motor 10. As the voltage of this direct current is increased to a certain value, the current becomes effective to energize the induction motor as synchronous motor, pulling it into actual synchronism. Theoretically, the rotary converter should be readily capable of being started to rotate in the desired direction by the application thereto of this direct current from the machine 24. This method of starting the rotary converter is more readily explained than it is capable of being successfully carried out. However, if the armature of the converter can be rotated at a very slow rate, the speed will readily pick up to value corresponding to the voltage supplied to the direct current side of the converter and the frequency of the alternating current supplied by the converter will be increased, thus increasing the speed of the induction motor 10 to a certain super-synchronous value.

The present invention includes means for facilitating the starting of the rotary converter to pull the main induction motor through synchronism, and it includes the use of an induction motor, 31, which may be of the squirrel-cage armature type, and which drives a shaft 32, preferably through a releasable clutch 34. A differential D is used to connect the shaft 32 to the shaft of the induction motor 10, and the direct current machine 24, these shafts being connected to the half-shafts of the differential, a releasable clutch 35 being provided in the connection from the shaft of the motor 10. A gear 37, associated with the revolving pinions forming the loose element or casing of the differential, is operatively connected with a gear 38 which is mechanically connected to the shaft of the rotary converter 18, preferably through a releasable clutch 39. A brake 41 may be provided for the purpose of putting a variable load upon the shaft 32, this feature being of considerable utility in connection with one embodiment of this invention.

If the shaft of the induction motor 10, is coupled to one half-shaft of the differential and the induction motor 31 to the other half-shaft, then with the proper gear ratio between the shaft of the rotary and the loose element of the differential, it will be apparent that, if the motor 10, rotary converter 18 and the induction motor 31 are wound for the same number of poles, the actual speed of the motor 10 plus the speed of the rotary converter 18 will be equal to synchronous speed of the motor 10. In other words, as the speed of the motor 10 decreases, the speed of the rotary converter increases, the sum of the two speeds being always equal to synchronous speed of the motor 10. In view of the fact that the motor 31 is of relatively small size and of less power than the rotary converter when the motor 10 is operating at any ordinary operating speed below synchronism, the motor 31 and its shaft 32 are forced to operate at synchronous speed, this being the resultant of the actual speed of the motor 10 and that of the rotary converter and the casing gear 37 of the differential. When the speed of the induction motor is at a maximum sub-synchronous value, the rotary converter tends to come to a stop, and the shaft 32 tends to operate at the same speed as the motor 10.

With the rotary stopped, by reversing and increasing the field of the direct current machine 24, a direct current of reversed polarity is produced at the terminals of the machine 24 and supplied to the direct current side 19 of the rotary. The circuit of this direct current is completed through the armature of the rotary converter and the secondary of the induction motor 10, causing the latter to pull into synchronism and operate as a synchronous motor. This increase in speed of the motor 10 to synchronism, causing a momentary difference in speed of the two half-shafts of the differential, will ordinarily be sufficient to produce rotation of the casing gear 37 and the rotary converter in the required direction.

By proper design of this motor 31, the energy required to drive it at synchronous speed may be such as to exert the required mechanical torque upon the armature of the rotary converter 18 to start rotation of the latter, this torque being exerted through the loose element 37 of the differential and gear 38. It will be apparent that the direction of rotation of the gears 37 and 38, and hence the rotary converter, is opposite to that in which these parts rotate when the motor 10 is operating below synchronous speed. As soon as the rotary converter starts to rotate, it supplies a low frequency alternating current to the secondary of the induction motor 10 and locks in step therewith, the set now functioning as a Kraemer unit.

It will be apparent that, as the converter accelerates, an alternating current of increasing frequency is supplied to the secondary of the induction motor 10, causing the speed of the latter to rise to a super-synchronous value determined by the field excitation of the direct current machine 24.

As soon as the rotary converter reaches its lowest stable operating speed, the set may be considered as being under stable operation at a super-synchronous speed. At this time, the power of the rotary converter is sufficiently great to overcome that of the induction motor 31, and, hence, the latter is forced to rotate at synchronous speed, the latter being the resultant of the super-synchronous speed of the motor 10 and the actual speed of the rotary converter which is now rotating in an opposite sense. It will be apparent that the speed of the motor 10 may be readily increased to the pre-determined maximum value by increasing the excitation of the direct current machine 24.

If the several alternating current machines of the set, that is, the induction motors 10 and 31 and the rotary converter 18 are of different numbers of poles, appropriate speed reducing or multiplying means should be inserted between the machines and the differential.

The brake 41 may be utilized as a load or drag assisting the motor 31 to reduce the speed of the shaft 32, being brought into operation at the time the motor 10 is pulled into synchronism, thus causing the required resultant rotation of the loose element of the differential and torque upon the shaft of the rotary converter. Likewise, the motor 31 and its clutch 34 may be eliminated entirely, as by holding the clutch in disconnected position, and the required resultant rotation of the loose element 37 of the differential and the consequent torque on the shaft of the converter may be secured by using the brake 41 as a drag or load on the shaft 32 to reduce its speed to any desired extent.

In view of the fact that the induction motor 31 is forced to operate at a synchronous speed when the motor 10 is operating at super-synchronous or sub-synchronous speeds, the motor 31 and the differential D may be disconnected from the remainder of the set by releasing the clutches 34, 35 and 39. These clutches may be operated and the motor 31 connected to the differential D only when it is desired to increase or decrease the speed of the set through synchronism.

In the embodiment of the invention disclosed in Fig. 2, the parts of the system are substantially the same as those of Fig. 1, with the exception that the motor 31 is connected to the shaft 32 through a speed-changing device 51, the latter including a shaft 53 connected to the shaft 32 through the releasable clutch 34, and cone pulleys 56 mounted upon the shaft 53 and the shaft of the motor 31 and connected by a driving belt 57, means being provided for shifting the belt, as indicated at 58, so as to secure different speed ratios between the two shafts.

Since the rotary converter of the ordinary Kraemer system may fall out of step and come to a standstill when the frequency of the alternating current in its armature circuit falls as low as two or three cycles, operation of the set at speeds between approximately 4% below and above synchronous speed is quite unstable. With the modified system of Fig. 2 stable operation of the shaft 32 at synchronous speed or a speed very closely approximating the same may be readily secured, independently of the normal operating speed of the induction motor 31. This result is secured by reason of the fact that the motor 31 is effective, through the speed-changing device 51 and the differential D to cause operation of the rotary converter at the required slow speed to produce the necessary low frequency current for the secondary of the induction motor 10. This will enable the set to operate as a Kraemer unit at any speed from its minimum clear up to and beyond synchronous speed, up to its maximum operative speed.

With this system of Fig. 2, the motor 31 can be of such design that the power required to drive it at synchronous speed is sufficient to bring the rotary converter into operation from a state of rest. The speed-changing device 51 is adjusted so that the motor 31, when operating at normal sub-synchronous speed, drives the shaft 32 at synchronous speed. During operation of the induction motor 10 at sub-synchronous speeds, even up to actual synchronous speed, the balance of power required to overcome the friction of and to maintain the rotary locked in step with the induction motor 10, is supplied through the differential. Thus, any sub-synchronous speed up to actual synchronism may be considered as a stable operating speed of the induction motor.

In carrying the speed of the induction motor 10 above synchronism, the speed is carried up to approximately synchronous speed at which time the rotary is practically stationary by decreasing the field excitation of the direct current machine 24; and then this field may be reversed and a field in the opposite direction supplied, the latter being sufficient to cause direct current to be supplied through the armature of the rotary to the secondary of the induction motor, causing the latter to lock in synchronism as a straight synchronous motor. Then, the speed-changing device 51 may be adjusted so as to increase the speed of the induction motor 31, considering it as being driven from the shaft 32, to a value which will cause the application of sufficient load to the shaft 32 to force the latter to slow down and thus cause rotation of the loose element of the differential and the rotary converter in the required direction to furnish low frequency current to the secondary of the induction motor and thus cause operation of the latter at super-synchronous speed. When rotation of the rotary converter in the proper direction is once started, the frequency of the current supplied by the rotary to the induction motor and the speed of the latter increase to values corresponding to the field excitation of the direct current machine 24.

As described in connection with the sub-synchronous operation of the motor 10, any stable operating speed between a substantially synchronous value and the maximum value may readily be attained and maintained.

Due to the fact that any ordinarily required speed ratio may be attained between the motor 31 and the shaft 32 through the speed-changing device 51, a synchronous motor may be substituted for the induction motor 31 of the system of Fig. 2, in order to carry the speed of the motor 10 from a synchronous to a super-synchronous value, the required load may be put on the shaft 32 by disconnecting the motor 31 from the supply line, thus allowing it to act as a drag or brake on the shaft 32.

The system of Fig. 1 may be modified to the extent of substituting a synchronous motor for the induction motor 31. In such a modified system, the synchronous motor may be directly connected to the shaft 32, preferably with an artificial load thereon, probably in the form of fan vanes, and operated continuously while the set is operating at any normal speed above or below the synchronous value. As described in connection with the system of Fig. 2, the shaft 32 is normally maintained at synchronous speed and serves to keep the rotary in step with the induction motor 10 up to synchronous speed and thus insures stable operation of the rotary and the motor 10 up to synchronous speed of the latter. In bringing the speed of the set from synchronism to a super-synchronous value, the auxiliary synchronous motor 31 may be disconnected from the line so as to operate as a drag upon the shaft 32, thus causing the loose element of the differential and the shaft of the rotary converter to operate in the required direction. With this latter arrangement, the rotary converter and the synchronous motor may both be synchronized before the clutches 39 and 34 are actuated to mechanically connect these elements to the other parts of the system during the starting of the set.

Instead of the variable speed device 51 shown in Fig. 2, the motor 31 may be a variable speed motor, preferably of the wound motor type with a variable resistance in its secondary circuit, and a constant speed reduction may be used between the shaft 32 and the motor 31, the speed reduction and secondary resistance of the motor being so selected that the motor can exert the required power on the shaft 32. In carrying the speed of the induction motor 10 from a synchronous to a super-synchronous value, the speed of the motor 31 may be varied by varying the secondary resistance thereof.

It will be apparent that the above described systems of control are readily applicable to a Kraemer set of the type wherein the direct current machine, instead of being mounted on the shaft of the main induction motor, is directly connected to an asynchronous generator which is connected to the line supplying the main induction motor and serves to transfer energy to the line when the main motor is operating at sub-synchronous speeds and to absorb energy from the line when it is operating at super-synchronous speeds. In this latter system, the differential would be connected as shown in the drawing herein, the direct current machine being only electrically connected to the other parts of the set.

This invention, while described with respect to its use in connection with a Kraemer set, is readily applicable, as to its essential features, to other systems of speed control of induction motors, especially where an electrical converter of any form is driven entirely or partly by slip energy of the induction motor, or has an alternating current element electrically connected to the secondary of the induction motor, and it is desirable to insure that the converter shall maintain a required speed relation with the induction motor. Under the term "induction motor" is intended to be included an alternating current motor having one element provided with an inducing winding to which is supplied alternating current and during operation of which motor, either normal or in starting or the like, current of variable frequency is supplied to a winding on the second element of the motor.

It should be understood that the invention claimed is not limited to the exact details of construction shown and described herein, for obvious modifications will occur to one skilled in the art.

It is claimed and desired to secure by Letters Patent:

1. In combination, an induction motor having a phase wound secondary, and means for controlling the speed of said induction motor, said controlling means comprising a direct current source of variable voltage, a rotary converter electrically connectible between said source of direct current voltage and the secondary of said induction motor, and means operative to cause the application of a mechanical torque to the shaft of said converter when the speed of said converter closely approaches zero, said latter means including a mechanical connection between said induction motor and said rotary converter.

2. In combination, an induction motor having a phase wound secondary, and means for controlling the speed of said induction motor, said controlling means comprising a direct current source of variable voltage, a rotary converter electrically connectible between said source of direct current voltage and the secondary of said induction motor, a differential mechanical connection between said induction motor and said rotary converter, and means for causing the application of a driving torque through said differential connection to the shaft of said converter when the speed of the latter closely approaches zero.

3. In combination, an induction motor having a phase wound secondary, and means for controlling the speed of said motor, said controlling means comprising a direct current machine adapted to operate either as a motor or a generator, and a rotary converter having its alternating current side electrically connectible to the secondary of said induction motor and its direct current side electrically connectible to said direct current machine, and a mechanical differential having rotative parts operatively connectible to the shafts of said induction motor and said rotary converter, and means for causing another rotative part of said differential to operate at a lower speed than the shaft of said induction motor.

4. In combination, an induction motor having a phase wound secondary, and means for controlling the speed of said motor, said controlling means comprising a direct current machine adapted to operate either as a motor or a generator, and a rotary converter having its alternating current side electrically connectible to the secondary of said induction motor and its direct current side electrically connectible to said direct current machine, a mechanical differential connection between said induction motor and said rotary converter, and a motor operatively connectible to said differential.

5. In combination, an induction motor having a phase wound secondary, and means for controlling the speed of said motor, said controlling means comprising a direct current machine adapted to operate either as a motor or a generator, and a rotary converter having its alternating current side electrically connectible to the secondary of said induction motor and its direct current side electrically connectible to said direct current machine, a mechanical differential having rotative parts operatively connectible to said induction motor and said rotary converter, and a variable speed motor drive for another rotative element of said differential.

6. In combination, an induction motor having a phase wound secondary, and means for controlling the speed of said motor, said controlling means comprising a direct current machine adapted to operate either as a motor or a generator, and a rotary converter having its alternating current side electrically connectible to the secondary of said induction motor and its direct current side electrically connectible to said direct current machine, a mechanical differential having rotative parts operatively connectible to said induction motor and said rotary converter, and an alternating current motor operatively connectible to another rotative element of said differential, said latter motor being operative to insure rotation of said converter in the required direction when the speed of the latter closely approaches zero and the speed of said induction motor closely approaches its synchronous value.

7. In combination, an induction motor having a phase wound secondary, and means for controlling the speed of said motor, said controlling means comprising a direct current machine adapted to operate either as a motor or a generator, and a rotary converter having its alternating current side electrically connectible to the secondary of said induction motor and its direct current side electrically connectible to said direct current machine, a mechanical differential having rotative parts operatively connectible to said induction motor and said rotary converter, a shaft operatively connectible to another rotative element of said differential, a driving motor, and a variable speed driving connection between said motor and said latter shaft.

8. In combination, an induction motor having a phase wound secondary, and means for controlling the speed of said motor, said controlling means comprising a direct current machine adapted to operate either as a motor or a generator, and a rotary converter having its alternating current side electrically connectible to the secondary of said induction motor and its direct current side electrically connectible to said direct current machine, a mechanical differential having one half-shaft operatively connectible to said induction motor, and the other half-shaft operatively connectible to a variable speed driving shaft, and the revolving pinions of said differential operatively connectible to the shaft of said rotary converter.

9. In combination, an induction motor, and means for controlling the speed of said motor, said controlling means comprising a rotary converter, an adjustable source of direct current voltage, the alternating current side of said converter being electrically connectible to the secondary of said induction motor and the direct current side of said converter being electrically connectible to said direct current source, a mechanical differential connection between said induction motor and said rotary converter, a motor, and a variable speed connection between said latter motor and a rotative element of said differential operative to cause the application of sufficient torque to the shaft of said rotary converter to cause the latter to operate at required speeds closely approaching zero.

10. In combination, an induction motor having a phase wound secondary and means for controlling the speed of said motor, said controlling means comprising a direct current machine adapted to operate either as a motor or a generator, and a rotary converter having its alternating current side electrically connectible to the secondary of said induction motor and its direct current side electrically connectible to said direct current machine, and means for insuring the maintenance of said rotary converter in step with said induction motor at all speeds of the latter up to substantially synchronous speed thereof, said means comprising a mechanical differential connection between said induction motor and said rotary converter, and power absorbing means connected to a rotatable element of said differential.

11. In combination, an induction motor having a phase wound secondary, and means for controlling the speed of said motor, said controlling means comprising a direct current machine adapted to operate either as a motor or a generator, and a rotary converter having its alternating current side electrically connectible to the secondary of said induction motor and its direct current side electrically connectible to said direct current machine, and means for insuring the maintenance of said rotary converter in step with said induction motor at all speeds of the latter up to substantially synchronous speed thereof, said means comprising a mechanical differential connection between said induction motor and said rotary converter, and a motor mechanically connected to one rotatable element of said differential and operative to insure operation of said element at synchronous speed.

12. In combination, an induction motor having a phase wound secondary, and means for controlling said induction motor comprising a rotary electrical converter electrically connected to the secondary element of said motor, and means automatically operative to supply to said converter the excess power required to insure the operation of said converter in step with said induction motor as the speed of the latter closely approaches its synchronous value, said means comprising a differential mechanical driving connection between said induction motor and said converter.

13. In combination, an induction motor having a phase wound secondary, means for controlling said induction motor comprising a rotary electrical converter electrically connected to the secondary element of said motor, and means for insuring the maintenance of said converter in step with said induction motor at all speeds of the latter, said means comprising a mechanical connection between a power source and said converter, the speed of operation of said mechanical connection being automatically variable in response to the adjusted speed of operation of said induction motor.

14. In combination, an alternating current motor having a phase wound secondary, means for controlling said motor comprising an electrical converter electrically connected to the secondary element of said motor, and means for insuring the maintenance of said converter in step with said motor at all speeds of the motor, said latter means including a variable speed mechanical connection between said motor and said converter.

15. In combination, an alternating current motor having a phase wound secondary, means for controlling said motor comprising an electrical machine electrically connectible to the secondary element of said motor, and means for insuring the maintenance of said machine in step with said motor at all speeds of the motor, said latter means including a mechanical differential connection operatively connectible to said motor and having its differential speed element connectible to said machine.

16. In combination, an alternating current motor having a phase wound secondary, means for controlling said motor comprising a dynamo-electric machine electrically connectible to the secondary element of said motor, and means for causing the speed of said motor to vary from a sub-synchronous value to a super-synchronous value, said latter means including a variable speed mechanical connection between said motor and said dynamo-electric machine.

17. In combination, an alternating current motor having a phase wound secondary, means for controlling said motor comprising an electrical converted electrically connectible to the secondary element of said motor, and means for causing the speed of said motor to vary from a sub-synchronous value to a super-synchronous value, said latter means including a mechanical differential connection operatively connectible to said motor and having its differential speed element connectible to said converter, and means for causing a third rotatable element of said differential connection to operate at a variable speed.

18. In combination, an alternating current motor comprising relatively rotatable elements, one of said elements being provided with a primary inducing winding and the other element being provided with a winding connectible to be supplied from a source of variable frequency, and means for controlling the operation of said motor, said controlling means comprising a source of variable frequency including an electrical converter connectible to the winding on the second element of said motor, and means for definitely insuring that said variable frequency source supplies to said latter winding current whose frequency is proportional to the slip of said motor for all values thereof corresponding to operation of said motor throughout a substantial range of speeds above and below synchronous speed, said latter means including a variable speed drive for a rotary element of said converter through a mechanical differential which is driven from the shaft of said motor and a second shaft operable at a definite speed.

19. In combination, an alternating current motor having relatively rotatable elements, one of said elements being provided with a primary inducing winding and a second element having a winding, and means for controlling the operation of said motor comprising a source of variable frequency including an electrical converter operable to supply current of variable frequency and electrically connectible to the winding of said second element of the motor, and a variable speed mechanical connection between said motor and a rotatable element of said converter.

In testimony whereof, the signature of the inventor is affixed hereto.

HENRY V. NYE.